Nov. 2, 1965   A. SILVER ETAL   3,215,479

HYDRODYNAMIC SHAFT BEARING

Filed July 11, 1963

INVENTORS:
ALEXANDER SILVER,
ALFRED F. STAHLER,
BY

Attorney.

United States Patent Office 3,215,479
Patented Nov. 2, 1965

3,215,479
HYDRODYNAMIC SHAFT BEARING
Alexander Silver, Tarzana, and Alfred F. Stahler, Los Angeles, Calif., assignors to The Garrett Corporation, Los Angeles, Calif., a corporation of California
Filed July 11, 1963, Ser. No. 294,378
12 Claims. (Cl. 308—121)

This invention relates generally to rotary bearings and more particularly to improvements in hydrodynamic rotary bearings.

Antifriction bearings may be broadly classified into three groups, as follows:

(1) Bearings which operate with dry friction between the relatively movable bearing surfaces,
(2) Bearings with rolling contact, and
(3) Fluid film lubricated bearings.

In dry friction bearings, the relatively movable bearing surfaces rub directly against one another with no effective lubricating film therebetween. In bearings with rolling contact, the relatively movable bearing surfaces are supported for relative movement by intervening rollers, balls, or other similar mechanical antifriction means. Finally, in fluid-film lubricated bearings, the relatively movable bearing surfaces are supported for relative movement by an intervening lubricating film.

Included in the group of fluid lubricated bearings are externally pressurized bearings, commonly referred to as hydrostatic bearings, and self-acting or self-pressurizing bearings, commonly referred to as hydrodynamic bearings. Hydrostatic bearings receive a constant flow of lubricant under pressure from an external lubricant source which generates the required lubricating film pressure in the bearing. In hydrodynamic bearings, on the other hand, the required lubricating film pressure is generated by the relative movement of the bearing surfaces. Hydrodynamic bearings, however, may be supplied with a constant flow of lubricant from an external source to maintain a sufficient quantity of lubricant in the bearing or to cool the bearing.

A general object of the present invention is to provide improved rotary hydrodynamic bearings.

Hydrodynamic radial bearings are well-known in the art and are particularly adapted to ultra-high rotary speed applications. As a matter of fact, the rotational speeds of some rotary machines are so high as to preclude the use of radial bearings other than hydrostatic or hydrodynamic bearings. If, in addition, it is impractical or impossible to provide the required external pressurized lubricant supply for a hydrostatic bearing, as is often the case, the bearing choice is further narrowed to hydrodynamic bearings alone. Hydrodynamic radial bearings, therefore, are becoming increasingly important in the bearing art.

At this point, attention is directed to the fact that both hydrostatic and hydrodynamic bearings may be designed to use either a liquid or a gaseous lubricant. Air, for example, is commonly used as a lubricant in both hydrostatic and hydrodynamic gas bearings. For simplicity, the present invention is disclosed herein primarily in connection with the use of a gaseous lubricant, such as air or other suitable gas. As will be seen later, however, the improved hydrodynamic bearings of the invention may be designed for use with liquid as well as gaseous lubricants.

Various hydrodynamic radial bearing configurations are presently available. Unfortunately, however, these existing hydrodynamic bearings, while satisfactory for various applications, possess certain inherent deficiencies which detract from their usefulness and even preclude their use in many present day, ultra-high speed, rotary machines. The deficiencies referred to here involve the extremely high degree of accuracy and precision with which the existing hydrodynamic radial bearings must be machined, the inherent hydrodynamic instability of these bearings, and various other related characteristics thereof.

Actually, the existing hydrodynamic bearing configurations, including radial bearings, thrust bearings, and slider bearings, have been studied, tested, and analyzed in such great detail that the above-stated deficiencies are well-known to and understood by those skilled in the art. Nevertheless, since the present invention is so intimately involved with such deficiencies, it is thought desirable to consider the latter briefly at this point, as they apply to hydrodynamic radial bearings, in the interest of a more thorough understanding of the present invention.

To this end, consider a simple fixed geometry, hydrodynamic gas radial bearing system comprising a rotor or shaft and a bushing in which the shaft turns. As the shaft is accelerated from rest, the gas between the shaft and bushing is subjected to a shear action; that is to say, the boundary layer of gas adjacent the bushing tends to remain stationary because of the friction between the bushing surface and the gas while the boundary layer of gas adjacent the shaft tends to rotate with the latter because of the friction between the gas and the shaft surface. Every physical shaft, of course, is subjected to radial loading. Such loading may include, for example, the weight of the shaft, in those cases where the shaft axis is other than vertical, centrifugal force acting on the inherent shaft unbalance, assymetrical driving forces on the shaft, gyroscopic forces, in those cases where the shaft is subjected to attitude changes, acceleration and deceleration forces, and so on.

This radial loading on the shaft causes the latter to assume an eccentric position in the bushing, whereby the annular clearance space between the shaft and bushing is restricted at the position of closest approach of the shaft to the bushing. The opposing surfaces of the shaft and bushing converge as they approach this restriction in the direction of shaft rotation and diverge as they recede from the opposite side of the restriction. Accordingly, a wedge-shaped or convergent zone exists between the shaft and bushing surfaces immediately ahead of the restriction and a divergent zone exists immediately behind the restriction. Owing to the internal friction of the gas in the bushing and the friction between the gas and shaft, rotation of the latter wipes or drives the gas into the convergent zone, thereby creating a relatively high pressure area in the latter zone and a relatively low pressure area in the divergent zone. Accordingly, gas tends to leak or squeeze between the shaft and bushing from the high pressure, convergent zone to the low pressure, divergent zone and thereby create a film between the shaft and bushing. As the shaft continues to accelerate, the gas pressure eventually becomes sufficient to lift or displace the shaft from the bushing, thereby creating a hydrodynamic film between the bushing and shaft which supports the rotating shaft. The gas then commences to rotate or whirl around the clearance space between the bushing and shaft with an average rotational speed which is approximately one half the rotational speed of the shaft. At this time, the net transport of gas into the restriction between the shaft and bushing is sufficient to maintain the hydrodynamic film pressure required to support the shaft.

During the initial acceleration of the shaft, the latter tends to rotate on its geometric axis, and centrifgal force acting on the inherent eccentric mass of the shaft causes the latter to orbit or whirl in bushing at synchronous speed, that is at a rotational speed equal to the rotational speed of the shaft on its axis. This orbiting or whirling motion is commonly referred to as synchronous whirl and may involve either or both the cylindrical mode and conical mode. The amplitude of the synchronous whirl increases as the shaft speed approaches its lowest critical speed. In some hydrodynamic radial bearings, maximum shaft speed is limited by synchronous whirl.

Synchronous whirl, however, does not limit maximum shaft speed in all of the existing hydrodynamic radial bearings, particularly if the lowest critical speed is passed through rapidly. For example, since the orbiting amplitude of synchronous whirl becomes maximum at a relatively slow shaft speed, i.e., as the shaft approaches its lowest critical speed, a bearing may not incur damage even though synchronous whirl causes contact of the shaft with the bushing. Moreover, the hydrodynamic film remains effective and may impose a non-linear damping and cushioning action on the shaft which inhibits damaging contact of the latter with the bushing. In addition, many of the existing bearings are stepped, or provided with extremely small clearances, or equipped with means to exert a radial stabilizing load on the shaft, or otherwise constructed to avoid failure due to synchronous whirl. Once the lowest critical speed is exceeded, the shaft tends to rotate on its mass axis so that synchronous whirl instability does not pose any further problem.

As the shaft speed of the existing radial bearings continues to increase, however, the bearings exhibit a much more serious form of instability as the shaft approaches a speed approximately twice the lowest critical shaft speed. This instability is known by various names but is most commonly referred to as half frequency, or half-speed whirl instability. Half-speed whirl instability results from the fact that as the shaft approaches a speed approximately equal to twice its lowest critical speed it inherently tends to undergo harmonic vibration or whirl at its lowest critical frequency. This harmonic vibration is super-imposed on the synchronous shaft whirl and is stimulated or excited by the pressure of the half-speed, rotating hydrodynamic film whose average velocity then approaches the latter critical frequency. As a result the excursions of the shaft rapidly increase in amplitude and the shaft approaches the bushing. During such half-speed whirl of the shaft, its whirl velocity approximates the average velocity of the fluid film. When this occurs, film support is lost with respect to the half-speed orbiting of the shaft. The end result of the rapid increase in amplitude of the shaft excursions and the loss of hydrodynamic film support is direct contact of the rotating shaft with the bushing. This, then, is half-speed whirl instability. Since contact of the shaft with the bushing occurs at relatively high shaft speeds, the existing gas-lubricated hydrodynamic radial bearings almost invariably fail due to such half-speed whirl instability.

Various hydrodynamic radial bearing configurations have been devised in the past to reduce half-speed whirl instability and to increase the maximum safe shaft speed. While some of these bearing configurations have been successful to a limited extent, they are, in general, complex, costly to make, and, at best, do not permit shaft speeds on the order of those permitted by the hydrodynamic radial bearing configurations of this invention.

While the foregoing discussion has concerned itself with gas bearings, it will become evident to those skilled in the art as the description proceeds that the invention is applicable to both gas-lubricated and liquid-lubricated bearings.

A more specific object of the invention, therefore, is to provide improved hydrodynamic bearings which avoid the above noted and other deficiencies of the existing hydrodynamic bearings.

An object of prime importance is to provide improved hydrodynamic bearings wherein the rotor or shaft is partially resiliently supported by a compliant bearing surface which acts in a new and unique way to both materially reduce half-speed whirl instability of the bearings and to minimize the possibility of bearing failure due to any half-speed whirl instability that does exist.

Another object of the invention is to provide improved hydrodynamic bearings which possess higher degree of bearing stiffness than the previously known bearings.

A further object of the invention is to provide improved hydrodynamic bearings which are characterized by their simplicity of construction, economy of manufacture, ability to accommodate bearings misalignment, dirt resistance, ease of repair, relatively large clearances and resulting relatively large manufacturing tolerances, and various other unique features of construction and operation, whereby the bearings are ideally suited to their intended purposes.

Other objects, advantages, and features of the invention will become apparent to those skilled in the art as the description proceeds.

Briefly, the objects of the invention are attained by providing radial bearings which may be considered broadly as improvements over the "foil bearings" of the prior art. In the present hydrodynamic bearings, the rotor journal or shaft is rotatably supported in a partial journal bearing which encompasses less than 180° of the shaft. The shaft is retained in this partial bearing by a thin, flexible, compliant bearing strip or foil which wraps about a portion of the shaft and is longitudinally stressed in tension to retain the shaft within the partial journal bearing. In some forms of the invention, the partial bearing is rigidly mounted and in other forms is resiliently or spring mounted. The required bearing foil tension is maintained, in some forms of the invention, by anchoring the foil at both ends to the partial bearing. In this case, foil tension prior to shaft rotation may be zero. In other forms, the foil tension is maintained by the spring mounting for the partial bearing or by a spring or weight attached to one end of the foil.

When the shaft is driven in rotation, hydrodynamic films are generated between the shaft and the partial bearing and between the shaft and the bearing foil, which films rotatably support the shaft in much the same way as in conventional hydrodynamic bearings. Being compliant, the bearing foil accommodates limited vibratory or orbital excursions of the shaft as its speed approaches and passes through the critical frequencies. The hydrodynamic films and bearing foil, however, cushion and dampen such shaft excursions.

In addition to accommodating and damping the vibratory shaft excursions, the compliant bearing foil exhibits certain unique actions which, although not fully understood, have been found to inhibit, and prevent bearing failure due to, half-speed whirl instability. Certain theories concerning these actions of the bearing foil will be discussed in the ensuing description.

At this point attention is directed to the fact that by the expression "bearing foil" as used herein is meant, essentially, a thin flexible film lubricated bearing element or strip whose thickness relative to its other dimensions is such that it will be locally deflected by the hydrodynamic film forces between the shaft and foil. In this regard, for example, the bearing foils of this invention differ from a resiliently supported shoe bearing which is compliant only with respect to its support and is rigid with respect to its own geometry.

A better understanding of the invention may be had from the following detailed description of particular illustrative embodiments if thereof taken in connection with the attached drawings; wherein.

Figure 1:
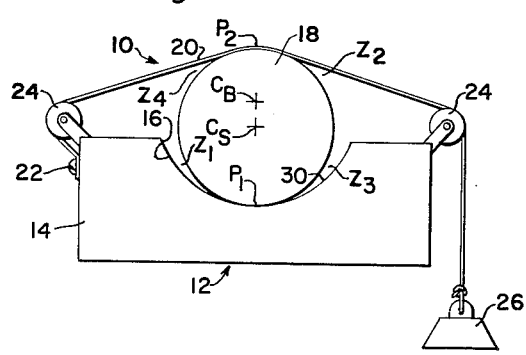
FIG. 1 illustrates a hydrodynamic radial bearing according to the invention when the rotatably supported shaft is at rest.
Figure 2:
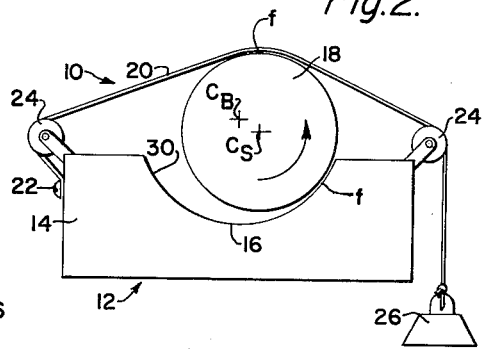
FIG. 2 illustrates the bearing of FIG. 1 during rotation of the shaft at a speed sufficient to generate hydrodynamic bearing films between the shaft and the bearing surfaces.

The hydrodynamic radial bearing 10 illustrated in FIGS. 1 and 2 of these drawings comprises a partial journal bearing 12 including a bearing block 14 having an approximately semicircular bearing recess 16 in its normally upper edge. Seating in this recess is the rotor or shaft 18 to be rotatably supported. According to the present invention, the shaft 18 is retained in the bearing recess 16 by a thin, flexible, compliant bearing strip or foil 20. Bearing foil 20, in the bearing under consideration, is attached at one end to an end face of the bearing block 14 by means of a screw 22 or in some other convenient way. The bearing foil extends from this anchored end thereof over the shaft 18, which protrudes from the bearing recess, as shown, around rounded surfaces or rollers 24 at the opposite ends of the bearing block. The free end of the bearing foil hangs vertically from the adjacent roller 24 along and in spaced relation to the adjacent end face of the bearing block.

Various materials may be used for the bearing foil 20. One material which has been found especially suitable for this purpose, however, is a plastic film manufactured by E. I. du Pont de Nemours & Co., Inc., under the trademark Mylar which is understood to comprise a polyethylene terephthalate film. Accordingly, the bearing foil preferably comprises such Mylar film.

Figure 3:
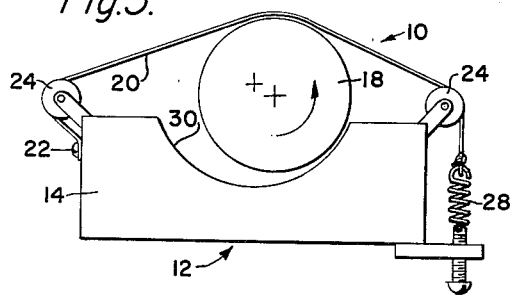
FIG. 3 illustrates a modified hydrodynamic radial bearing according to the invention.

The bearing foil 20 must be tensioned to retain the shaft 18 in its bearing recess 16. In FIGS. 1 and 2, the required tension is maintained in the bearing foil by a weight 26 attached to its free end. In FIG. 3, the required foil tension is maintained by a spring 28 acting between the free end of the foil and the bearing block.

It has been found that if the peripheral portion of the shaft 18 in contact with the bearing foil 20 moves in a direction away from the free end of the foil, the torque required to drive the shaft from rest is less than the starting torque required to drive the shaft in the opposite direction. For this reason, the direction of shaft rotation indicated in the drawing is preferred. Nevertheless, the present hydrodynamic bearing operates as well when the shaft rotates in the opposite direction so that as far as the invention is concerned, the shaft may rotate in either direction or it may periodically reverse its direction of rotation.

In a typical bearing according to the invention, the diameter of the bearing recess 16 is on the order of 0.001 inch larger than the diameter of the shaft 18 per inch of shaft diameter. Accordingly, if the shaft was exactly centered in the recess, a radial clearance on the order of 0.0005 inch per inch of diameter would exist between the surface of the shaft and the surface 30 of the bearing recess. This clearance as well as the subsequently discussed shaft displacements have been exaggerated in the drawings for the sake of clarity.

Assume now that the shaft 18 is initially at rest. Under these conditions, the shaft rests on the bottom of the bearing recess 16 and the bearing foil 20 rests directly on the upper surface of the shaft, as shown in FIG. 1. As the shaft is accelerated from rest in a gaseous environment, which may be simply the atmosphere, the air or other gas between the surface 30 of the bearing recess 16 and the surface of the shaft 18 and between the surface of the shaft and the confronting surface of the bearing foil 20 is subjected to a shear action as in conventional hydrodynamic bearings. Thus the boundary layers of gas adjacent the bearing surface 30 and the bearing foil 20 tend to remain stationary while the boundary layer of gas adjacent the shaft surface tends to rotate with the shaft.

Since the shaft initially rests on the bottom of the bearing recess 16, the shaft is eccentric to the recess, the shaft center $C_s$ then being located approximately directly below the center $C_B$ of the bearing recess, as shown in FIG. 1. Assuming the direction of shaft rotation shown, a convergent zone $Z_1$ is defined between the shaft and bearing surface 30 immediately ahead of the position at which the shaft most closely approaches, i.e. contacts, the bearing surface, when the shaft is at rest. A similar zone $Z_2$ precedes the position at which the shaft most closely approaches, i.e. contacts, the bearing foil 20.

As the shaft 18 is accelerated from rest, gas or air, depending upon the environment in which the bearing operates, is frictionally wiped or transported into the convergent zones $Z_1$ and $Z_2$ thereby increasing the gas pressure in these zones. The gas pressure in the divergent zones $Z_3$ and $Z_4$ following the positions of closest approach is decreased by shaft rotation so that gas tends to leak between the shaft 18 and bearing surface 30 and between the shaft and foil 20 from the high pressure convergent zones to the low pressure divergent zones. The gas pressure in the zones $Z_1$ and $Z_2$ increases with shaft speed and eventually becomes sufficient to lift the shaft clear of the bearing surface 30 and the bearing foil 20 clear of the shaft, as shown in FIG. 2. Hydrodynamic gas films $f$ will then exist between the shaft and the bearing surface and between the shaft and the bearing foil. These films rotatably support the shaft in much the same way as in conventional hydrodynamic gas bearings.

As is well-known in the art, the shaft of a hydrodynamic bearing, operating in equilibrium with a load of constant magnitude and direction on the shaft, tends to assume a position part way up the wall of the journal bearing surface on that side of the vertical toward which the shaft turns, as shown in FIG. 2. Thus, as the shaft 18 starts rotating in its initial position of FIG. 1, the force of the gas in the convergent zone $Z_1$ acts at an angle to the shaft load force, producing a resultant force in the shaft. This resultant force displaces the shaft to the position of FIG. 2, wherein the force of the gas film $f$ is equal and opposite to the load force.

In the absence of any other loads or forces on the shaft, the latter would continue to rotate in the equilibrium position of FIG. 2. In every physical rotor system, however, the shaft is subjected to other loads and forces. For example, every rotor system has some unbalance due to displacement of the rotor mass axes from its geometric axis. Such unbalance results in a centrifugal force on the shaft which causes the latter to orbit. This orbiting, as mentioned earlier, is commonly referred to as synchronous whirl and occurs at shaft speed. In conventional hydrodynamic bearings, synchronous whirl may limit shaft speed to less than the lowest critical shaft speed. Since a hydrodynamic gas film exhibits non-linear spring and damping characteristic, however, and since the first critical shaft speed is relatively low, bearing failure due to synchronous whirl may not occur even in a conventional fixed geometry hydrodynamic bearing, particularly if the critical shaft speed is passed through quickly.

At this point, two advantages of the present hydrodynamic bearing configuration of FIGS. 1 and 2 are evident. First, the bearing foil 18 is compliant, in contrast to the rigid wall of a conventional hydrodynamic bearing bushing. Being compliant, the foil accommodates limited synchronous excursions or orbiting of the shaft, thereby minimizing or eliminating the possibility of shaft seizure in the rigid partial journal bearing 12. Thus, referring to FIG. 2, it is evident that as the shaft 18 orbits toward the bearing foil 20, the pressure of the hydrodynamic film $f$ between the foil and shaft tends to increase and thereby displace the foil away from the shaft against the action of the tension in the foil. Conversely, when the shaft orbits away from the bearing foil, the film pressure tends to decrease, whereby the tension in the foil pulls the latter in toward the shaft. Accordingly, a generally constant hydrodynamic film pressure and thickness are maintained between the shaft and bearing foil as the latter moves toward and away from the journal bearing 12 to accommodate orbital motion of the shaft.

Secondly, the bearing foil 18, being under tension, introduces a damping action, in addition to the non-linear damping action known to be created by the gas films f, and a relatively constant radial loading on the shaft which inhibit synchronous orbiting or whirl thereof. Accordingly, actual bearings constructed in accordance with the invention have been found to be immune to failure due to synchronous whirl at the first or lowest critical shaft speed. In connection with the shaft damping and loading action of the foil, attention is directed to the fact that the thickness and pressure of the hydrodynamic film f between the shaft and foil tends to be uniform along its entire length because of the compliancy or flexibility of the foil. This, of course, results in more uniform loading of the shaft and superior damping of the orbital motions of the shaft. It is evident that the present bearing will accommodate both the cylindrical and conical modes of synchronous whirl. As noted earlier, the amplitude of synchronous whirl becomes maximum as the shaft 18 passes through its lowest critical speed, and when this speed is exceeded, the shaft commences to rotate on its mass axis, whereby synchronous whirl poses no further problem.

As the shaft 18 continues to be accelerated above the lowest critical speed, the speed of the shaft approaches a speed equal to twice the lowest critical speed at which failure occurs in conventional fixed geometry bearings and other existing hydrodynamic bearings due to half-speed whirl instability. As noted earlier, the present bearing configurations both minimize, or eliminate half-speed whirl instability and successfully avoid bearing failure from any half-speed whirl instability that does exist. The exact manner in which the present bearings operate to accomplish this is not known at the present. Discussed below are some of the actions and phenomena which are either known to occur or are thought to occur and which appear to contribute to the success of the present bearings. From the earlier discussion of conventional fixed geometry bearings, it will be recalled that half-speed whirl instability occurs as a result of excitation of the shaft into resonant vibration or whirl at the lowest critical shaft speed by the hydrodynamic film pressure and the other forces active on the shaft as the latter approaches a speed about twice its lowest critical speed. Bearing failure occurs due to the positive pumping action created by the orbiting shaft which results in loss of hydrodynamic film support and contact of the rapidly rotating shaft with the bushing. In other words, for half-speed whirl instability and bearing failure to occur, it is necessary (1) that the hydrodynamic film pressure and other forces active on the shaft excite the latter into a resonant whip, or whirl or vibration at the lowest critical speed of the shaft when the latter is rotating at about twice that speed, and (2) that the shaft orbit relative to the outer boundary of the hydrodynamic film at about the average rotational velocity of the film.

With regard to (1) above, it is evident from what has been said thus far about the action of the bearing foil 20 and from FIG. 2, that even though the shaft 18 orbits in the bearing 10, as a result of rotation of the shaft about its mass axes when the shaft speed exceeds the lowest critical speed, the hydrodynamic film thickness between the shaft and bearing foil remains generally constant due to the in and out compliant movement of the foil with the orbiting shaft. Moreover, the tension in the foil imposes a generally constant radial loading on the shaft so that the amplitude of the orbital excursions of the shaft with respect to the rigid partial journal bearing 12 are reduced. Accordingly, there is minimal variation in the clearance between the shaft and journal surface 30 as the shaft orbits. As a consequence, the shaft is constantly more centered with respect to the outer boundary surfaces of the hydrodynamic films f, i.e. the bearing surface 30 and the inner surface of bearing foil 20, than is a shaft which turns in a conventional fixed geometry bearing. This greater centering of the shaft reduces the tendency of the rotating hydrodynamic films f to excite the shaft into half-speed resonant whirl when the shaft speed approaches twice the lowest critical shaft speed. Moreover, the damping action imposed on the shaft by the tensioned foil inhibits to some degree such half-speed resonant whirl. Accordingly, in the present bearing, the tendency for the shaft to break into resonant half-speed whirl is reduced.

With regard to (2) above, it is evident that since the bearing foil 20 moves in and out with the shaft 18 as the latter orbits near twice critical speed, the orbital movement of the shaft is not relative to the bearing foil. Accordingly, the primary cause of failure in a fixed geometry hydrodynamic radial bearing, to wit, orbital movement of the shaft relative to the outer boundary of the hydrodynamic film, which boundary in the present bearings is defined in part by the bearing foil, at the average rotational velocity of the film, is eliminated insofar as the foil is concerned. Moreover, in the event of any reduction in the hydrodynamic film pressure between the shaft and foil, such as might cause failure in a conventional fixed geometry bearing, the tension in the foil immediately pulls the latter in toward the shaft 18, thereby restricting the clearance between the foil and shaft and restoring the film pressure to its proper value.

Since the bearing foil 20 exerts a constant load on the shaft 18, it is evident that the foil will also sense any reduction in the film pressure between the shaft and partial bearing surface 12 and displace the shaft toward the bearing surface 30, in response to such pressure reduction. The clearance between the shaft and bearing surface is thereby restricted to restore the film pressure to its proper value.

It is evident, of course, that since one half of the present bearing, i.e. partial journal bearing 12, is rigid like the bushing of a conventional fixed geometry hydrodynamic radial bearing, some half-speed whirl instability will occur. However, since the rigid journal bearing 12 encompasses at most only 180 degrees of the shaft, so that no continuous annular clearance exists about the shaft as in a conventional fixed geometry bearing, the half-speed whirl instability which does exist in the present bearing is much less than in conventional bearings. Accordingly, greater shaft speeds can be attained in the present bearing without failure than in the existing fixed geometry hydrodynamic bearings.

As the shaft 18 is accelerated above twice its lowest critical speed, of course, other critical speeds may be encountered, such as the speed at which the bearing foil 20 commences resonant vibration. Since the ratio of foil spring rate to foil mass is very high, however, the latter critical speed is high and may never be reached in practice.

Figure 4:
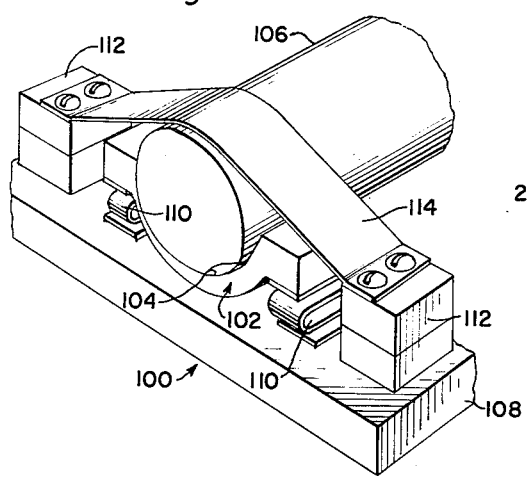
FIG. 4 illustrates a further modified hydrodynamic radial bearing according to the invention.

The modified radial bearing 100 of FIG. 4 includes a partial or half journal bearing 102 having a generally semicircular bearing recess 104 to receive the shaft 106 to be rotatably supported. Journal bearing 102 is resiliently supported on a base 108 by springs 110 having a resonant frequency higher than the maximum speed, or frequency, of shaft 106. On the base 108, at opposite sides of the shaft 106, are two blocks 112. A bearing foil 114, like that in the earlier form of the invention, extends across the shaft and is anchored at its ends to the blocks 112. The foil is proportioned to wrap partially around the shaft, as shown. In this form of the invention, the springs 110 perform the dual function of maintaining the proper tension in the bearing foil 114 and resiliently supporting the partial journal bearing 102.

Bearing 110 obviously functions in substantially the same manner as the earlier radial bearing. In the bearing 100, however, the resilient journal bearing support provided by the springs 110 lends compliancy to the latter bearing which accommodates limited orbiting or whirling of the shaft and at the same time dampens such orbiting. Half-speed whirl instability of the bearing is thus further reduced and the possibility of contact of the shaft with and seizure of the shaft in the journal bearing 102 is minimized. The resilient mounting of the journal bearing in FIG. 4 also tends to improve the pressure regulating action on the hydrodynamic film between the shaft and journal bearing, discussed above in connection with the bearing foil in FIGS. 1 through 3. The bearing configuration of FIG. 4 possesses the additional advantage of accommodation greater misalignment of the shaft and bearing than the bearing configuration of FIGS. 1 through 3.

Figure 5:
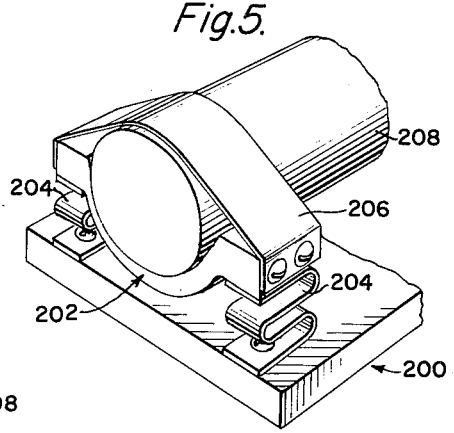
FIG. 5 illustrates a still further modified hydrodynamic radial bearing according to the invention.

The further modified radial bearing 200 of FIG. 5 is similar to that of FIG. 4 in that the partial or half journal bearing 202 is resiliently supported by springs 204. In the bearing 200, however, the ends of the bearing foil 206 are anchored to the journal bearing 202. As a result, the bearing foil must be stretched when it is attached to the journal bearing in order to create the required tension in the foil.

In the bearing 200, the resilient mounting of the journal bearing 202 serves primarily to accommodate and dampen shaft vibration and to permit greater misalignment of the shaft 208 and bearing.

At this point, several advantages of the present hydrodynamic bearing configurations, in addition to those already discussed, will be evident to those skilled in the art. Owing to the relatively large clearances and corresponding relatively small manufacturing tolerances involved in the present bearings, and their over-all simplicity, the latter are relatively simple and inexpensive to make. Moreover, the large clearances render the bearings relatively dirt resistant and enable the bearings to accommodate relatively large misalignment of the shaft and bearing. Repair of the present bearings is obviously extremely simple since it involves merely replacing the bearing foils which can be quickly and easily accomplished.

It is evident from the preceding description that the effective stiffness of the present bearings is dependent on the stiffness of the bearing foils. These foils, then, may be made as stiff as necessary to afford the bearings with the bearing stiffness required for the shaft loads involved.

The bearings may run on other lubricants than gas. Bearings according to the invention, for example, have been successfully operated using alcohol as a lubricant.

Clearly, therefore, the invention is fully capable of attaining the objects and advantages set forth.

Various modifications in the design, arrangement of parts and instrumentalities of the invention are possible within its spirit and scope.

We claim:
1. A film lubricated shaft bearing comprising:
   a bearing unit having a shaft receiving opening and including bearing means providing separate inwardly presented bearing surfaces spaced around said opening and each extending generally circumferentially about a portion only of said opening;
   said bearing surfaces being adapted to be supplied with a lubricating fluid and to support a shaft in said opening for relative rotation to a speed at least sufficient to generate a hydrodynamic lubricating film between said shaft and each bearing surface; and
   said bearing means including a rigid lower bearing element which furnishes a bearing surface beneath the shaft and a relatively thin, flexible, compliant bearing element stretched over the shaft which furnishes another of said bearing surfaces, whereby said latter element is adapted to be radially positioned relative to the shaft by hydrodynamic film pressure and to resiliently accommodate and dampen orbital motion of the shaft.
2. A bearing according to claim 1 wherein:
said last mentioned bearing element comprises a thin, flexible, resiliently compliant bearing foil.
3. A bearing according to claim 1 wherein:
said last mentioned bearing element comprises a thin, flexible, resiliently compliant bearing foil which is longitudinally stressed in tension when a shaft is positioned in said opening.
4. A film lubricated shaft bearing comprising:
   a partial journal bearing including a bearing block having a substantially semicircular bearing recess which provides a lower bearing surface for supporting a shaft;
   a thin, flexible, compliant bearing foil extending across above said recess to define with the latter a shaft receiving opening;
   said bearing foil being longitudinally stressed in tension when a shaft is positioned in said opening to maintain a shaft in said bearing block; and
   said bearing foil and bearing recess having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing foil is positioned relative to the shaft by hydrodynamic film pressure and resiliently accommodates and dampens orbital motion of the shaft.
5. The subject matter of claim 4 wherein:
said bearing foil is attached at one end to said bearing block; and
means attached to the other end of said bearing foil for stressing the latter in tension.
6. The subject matter of claim 4 wherein:
said bearing foil is attached at one end to said block; and
a spring acting between said block and the other end of said bearing foil for stressing the latter in tension.
7. The subject matter of claim 4 wherein:
said bearing foil is attached at one end to said bearing block; and
a weight attached to the other end of said bearing foil for stressing the latter in tension.
8. The subject matter of claim 4 including:
a supporting base for said block;
spring means resiliently supporting said block on said base; and
said bearing foil being attached at both ends to said base so as to be stressed in tension by said spring means.
9. The subject matter of claim 4 wherein:
said bearing foil is attached at both ends to said block and is longitudinally dimensioned to be stressed in tension when a shaft is inserted in said opening.
10. The subject matter of claim 9 including:
a supporting base for said bearing block; and
spring means resiliently supporting said block on said base.
11. In combination:
a partial journal bearing comprising a bearing block having a substantially semicircular bearing recess;
a shaft journalled in said recess for providing a bearing surface beneath the shaft;
a thin, flexible, compliant bearing foil stretched over said shaft so as to encompass a portion of said shaft and resiliently retain the latter in said recess; and
said bearing foil and bearing recess having inwardly presented bearing surfaces adapted to be supplied with a lubricating fluid and supporting said shaft for relative rotation to a speed at least sufficient to generate hydrodynamic lubricating films between said shaft and bearing surfaces, whereby said bearing foil is positioned relative to said shaft by hydrodynamic film pressure and resiliently resists orbital motion of said shaft.

12. In combination:
a bearing unit having a shaft receiving opening;
a shaft positioned in said opening;
said bearing unit including bearing means providing separate inwardly presented bearing surfaces spaced around said shaft and each extending generally circumferentially about a portion only of said shaft;
said bearing surfaces being adapted to be supplied with a lubricating fluid and to support a shaft in said opening for relative rotation to a speed at least sufficient to generate a hydrodynamic lubricating film between said shaft and each bearing surface;
said bearing means including a rigid bearing element disposed beneath said shaft to provide a supporting bearing surface and a relatively thin, flexible, resiliently compliant bearing element is disposed above the shaft to provide another bearing surface, whereby said latter element is adapted to be radially positioned relative to the shaft by hydrodynamic film pressure and to resiliently accommodate and dampen orbital motion of the shaft.

References Cited by the Examiner

UNITED STATES PATENTS

| 331,311 | 12/85 | Marquardt | 308—26 |
| 843,591 | 2/07 | Edwards | 308—26 |
| 1,411,127 | 3/22 | Stephens | 308—26 |

FOREIGN PATENTS

| 296,132 | 8/28 | Great Britain. |
| 372,419 | 5/32 | Great Britain. |

ROBERT C. RIORDON, *Primary Examiner.*

FRANK SUSKO, *Examiner.*